(12) United States Patent
Uemura

(10) Patent No.: US 7,307,355 B2
(45) Date of Patent: Dec. 11, 2007

(54) POWER SUPPLY APPARATUS FOR FUEL INJECTION APPARATUS

(75) Inventor: Kiyoshi Uemura, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 215 days.

(21) Appl. No.: 11/271,311

(22) Filed: Nov. 10, 2005

(65) Prior Publication Data

US 2006/0103237 A1    May 18, 2006

(30) Foreign Application Priority Data

Nov. 12, 2004  (JP) .............................. 2004-328634
Feb. 25, 2005  (JP) .............................. 2005-050972

(51) Int. Cl.
*F02D 41/00*  (2006.01)
*H02P 9/04*   (2006.01)

(52) U.S. Cl. ........................ 290/41; 290/40 A; 123/497
(58) Field of Classification Search .............. 290/40 R, 290/41, 40 A, 40 B, 40 C; 123/490, 497; 322/10, 11
See application file for complete search history.

(56) References Cited

U.S. PATENT DOCUMENTS 4,791,905 A * 12/1988 Furuta et al. ............... 123/497
5,714,971 A * 2/1998 Shalit et al. ................. 715/804
5,937,829 A * 8/1999 Endou ......................... 123/497
5,975,057 A * 11/1999 Repplinger et al. ......... 123/490
6,118,186 A * 9/2000 Scott et al. ............... 290/40 B
6,308,688 B1 * 10/2001 French et al. ............... 123/490
6,431,838 B2 * 8/2002 Tanaka et al. ................. 417/43
6,534,958 B1 * 3/2003 Graber et al. .................. 322/11
6,807,949 B2 * 10/2004 Kishibata et al. ............. 123/497

FOREIGN PATENT DOCUMENTS

JP          3024455        2/1996

* cited by examiner

*Primary Examiner*—Nicholas Ponomarenko
(74) *Attorney, Agent, or Firm*—Pearne & Gordon LLP

(57) ABSTRACT

A power supply apparatus comprised of a bridge circuit made up of rectification diodes and MOSFETs for rectifying an output of a generator through a full-wave rectifier circuit comprised of rectification diodes and parasitic diodes of the MOSFETs and obtaining a supply voltage of a fuel injection apparatus, the power supply apparatus being comprised of an FET control section which turns ON/OFF the MOSFETs to step up the output voltage of the generator and a transistor provided for each MOSFET, which is set in an ON-state for a period during which a reverse voltage is applied to a parasitic diode of each MOSFET and set in an OFF-state for a period during which a forward voltage is applied to the parasitic diode of each MOSFET, wherein a control voltage for turning ON the MOSFET is given between the gate and source of the corresponding MOSFET for a period during which each transistor is in an OFF-state.

4 Claims, 3 Drawing Sheets

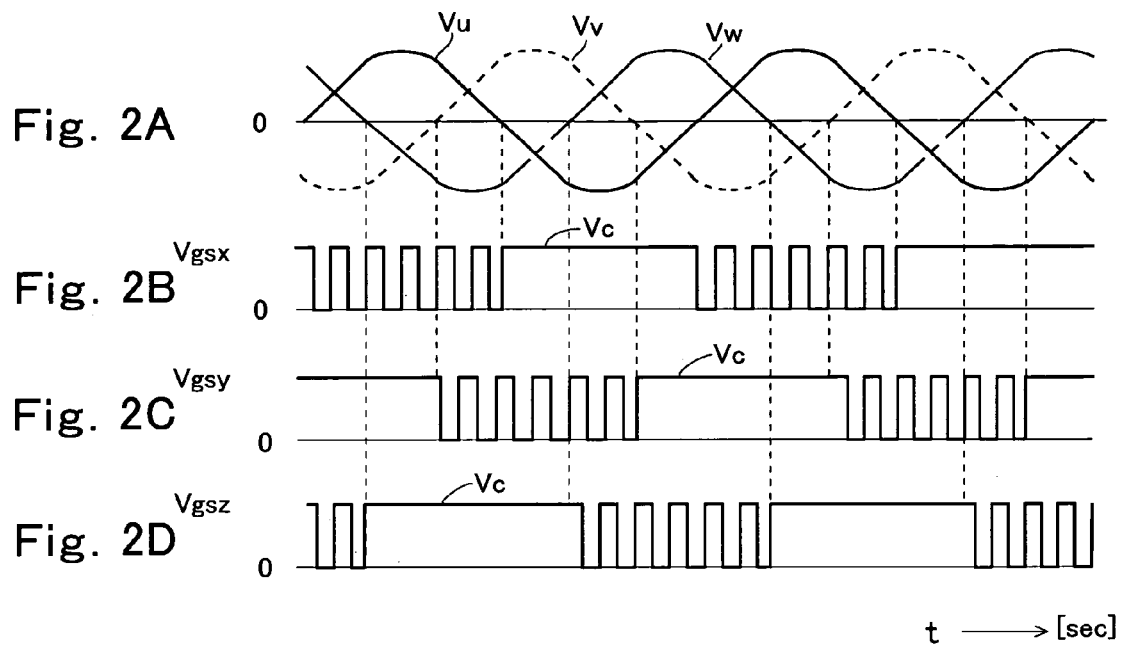
Fig. 2A
Fig. 2B
Fig. 2C
Fig. 2D
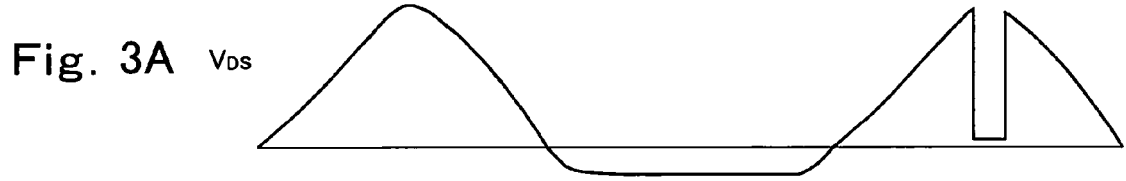
Fig. 3A $V_{DS}$
Fig. 3B $TR_1$
Fig. 3C $V_c$
Fig. 3D $V_s$
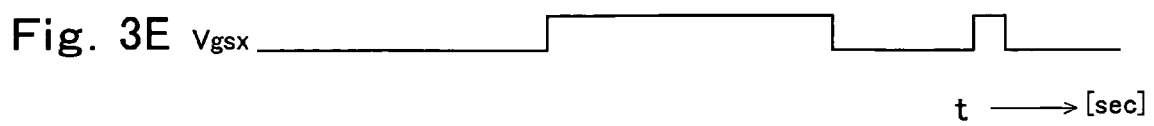
Fig. 3E $V_{gsx}$

POWER SUPPLY APPARATUS FOR FUEL INJECTION APPARATUS

TECHNICAL FIELD OF THE INVENTION

The present invention relates to a power supply apparatus for a fuel injection apparatus which supplies a supply voltage to the fuel injection apparatus of an internal combustion engine.

BACKGROUND OF THE INVENTION

A fuel injection apparatus for supplying fuel to an internal combustion engine which drives a vehicle without mounting no battery is driven by a power supply apparatus which generates a DC voltage using a magneto AC generator driven by the internal combustion engine as a power supply. When a fuel injection apparatus is operated using a magneto-generator driven by the internal combustion engine as a power supply, it is necessary to output a sufficiently high voltage from the power supply apparatus during low-speed rotation of the engine in order to improve a starting characteristic of the internal combustion engine. For this purpose, the number of windings of an armature coil of the magneto-generator may be increased, but increasing the number of windings of the armature coil reduces power generation output during a high-speed rotation of the engine. Decreasing the number of windings of the armature coil to improve power generation output during a high-speed rotation of the engine increases the rotational speed at which the fuel injection apparatus can operate normally, which deteriorates the starting characteristic of the engine.

Therefore, as described in Japanese Utility Model Registration No. 3024455, the applicant of the present invention has proposed a power supply apparatus which constitutes a full-wave rectifier circuit which rectifies output of a magneto AC generator with a bridge circuit comprised of a diode and a MOSFET (MOS type field effect transistor), controls ON/OFF of the MOSFET to thereby turn ON/OFF a current flowing from an armature coil of the generator through a rectifier circuit and obtain a stepped up DC voltage on the output side of the rectifier circuit.

The power supply apparatus disclosed in Japanese Utility Model Registration No. 3024455 is comprised of n (n: integer of 2 or greater) input terminals to which a single-phase or multi-phase AC voltage is input from a magneto AC generator driven by an internal combustion engine, m (m: integer of 2 or greater and not greater than n) MOSFETs with ones of drains and sources commonly connected and the others connected to m input terminals of the n input terminals, parasitic diodes formed between the drains and sources of the m MOSFETs and 2n−m rectification diodes provided so as to constitute together a diode bridge full-wave rectifier circuit which rectifies an AC voltage given to the n input terminals, an FET control section which controls MOSFETs with a reverse voltage applied to parasitic diodes between drains and sources out of the m MOSFETs when the rotational speed of the internal combustion engine is equal to or lower than a set value so as to turn ON/OFF at a frequency higher than the output frequency of the generator and a pair of output terminals to which the output voltage of the diode bridge full-wave rectifier circuit is applied, and a DC voltage obtained between the output terminals is given to the fuel injection apparatus of the internal combustion engine as a supply voltage.

The power supply apparatus disclosed in Japanese Utility Model Registration No. 3024455 is provided with a comparator which compares a potential of each input terminal of each phase, to which output terminals of each phase of the generator is connected, with a potential of other input terminal of other phase. The comparator compares the potentials of the input terminals of three phases, thereby detects whether a voltage applied between a drain and source of each MOSFET is in a positive half cycle period (half-cycle period during which a reverse voltage is applied to a parasitic diode of each MOSFET) or in a negative half-cycle period (half-cycle period during which a forward voltage is applied to the parasitic diode of each MOSFET) and gives a drive signal to turn ON/OFF each MOSFET between the gate and source of each MOSFET for a period during which a positive half-cycle voltage is applied between the drain and source of each MOSFET. Furthermore, for a period during which a forward voltage is applied to the parasitic diode of each MOSFET, the power supply apparatus is designed to reduce channel loss by giving a control voltage (voltage signal at a certain level) at an ON-level or higher between the gate and source of each MOSFET.

When the rotational speed of the engine is low and the voltage induced to the armature coil of the generator is low, the above described construction allows an intermittent current to flow from the armature coil through the MOSFET and allows the induced voltage to step up, thus making it possible to output a sufficiently high voltage from the power supply apparatus even when the rotational speed of the engine is low and cause the fuel injection apparatus to operate satisfactorily.

Furthermore, if a control voltage equal to or higher than the ON-level (level of the voltage given between the gate and source to turn on the MOSFET) is given between the gate and source of each MOSFET for a period during which a forward voltage is given to the parasitic diode formed between the drain and source of each MOSFET as described above, it is possible to reduce channel loss produced in the MOSFET and thereby improve the output during a low-speed rotation.

As described above, the conventional power supply apparatus is provided with a comparator which compares a potential of each input terminal of each phase with a potential of other input terminal of other phase to detect the polarity of the voltage applied between the drain and source of each MOSFET, and thereby requires an expensive comparator and cannot help but increase the cost. On the other hand, the conventional power supply apparatus disclosed in Japanese Utility Model Registration No. 3024455 requires the phase to be clearly distinguished when the output terminal of each phase of the generator is connected to the input terminal of the power supply apparatus, and therefore it is necessary to take measures to identify phases of output leads of the generator. For example, colors of output leads of the generator must be changed to identify phases of the output leads, which cause the cost of the generator to be increased.

SUMMARY OF THE INVENTION

An object of the present invention is to provide a power supply apparatus for a fuel injection apparatus with part of a rectifier circuit for rectifying output of a generator comprised of MOSFETs and having a function of stepping up the output of the generator by turning ON/OFF the MOSFETs during a low-speed rotation of the engine, capable of distinguishing the polarity of a voltage between a drain and source of each MOSFET without using many comparators and giving each MOSFET a drive signal to perform ON/OFF control and a control voltage to reduce channel loss.

Another object of the present invention is to provide a power supply apparatus for a fuel injection apparatus with part of a rectifier circuit for rectifying output of a generator comprised of MOSFETs and having a function of stepping up the output of the generator by turning ON/OFF the MOSFETs during a low-speed rotation of the engine, which eliminates the necessity to distinguish between phases when connecting the input terminals to the output terminals of the generator.

The present invention is applied to a power supply apparatus which gives a supply voltage to a fuel injection apparatus of an internal combustion engine.

The present invention is comprised of n (n: integer of 2 or greater) input terminals to which a single-phase or multi-phase AC voltage is input from a magneto AC generator driven by an internal combustion engine, m (m: integer of 2 or greater and not greater than n) MOSFETs with ones of drains and sources commonly connected and the others connected to m input terminals of the n input terminals, parasitic diodes formed between the drains and sources of the m MOSFETs and 2n−m rectification diodes provided so as to constitute together a diode bridge full-wave rectifier circuit which rectifies an AC voltage given to the n input terminals and an FET control section which performs control, when the rotational speed of the internal combustion engine is equal to or lower than a set value, so that MOSFETs, to the drain-source parasitic diodes of which a reverse voltage is applied out of the m MOSFETs are turned ON/OFF at a frequency higher than the output frequency of the generator, and a DC voltage output from the diode bridge full-wave rectifier circuit is given to the fuel injection apparatus of the internal combustion engine as a supply voltage.

According to the present invention, the FET control section is comprised of a low-speed drive signal supply circuit which gives, when the rotational speed of the internal combustion engine is equal to or lower than a set value, each MOSFET a drive signal varying between an ON level which turns ON each MOSFET and an OFF level which turns OFF each MOSFET at a frequency higher than the output frequency of the generator and a control voltage supply circuit provided with a control voltage supply control switch which is ON/OFF-controlled by the drain-source voltage of each MOSFET so as to be set in an OFF-state when a forward voltage is applied to the parasitic diode of each MOSFET and set in an ON-state when a reverse voltage is applied to the parasitic diode of each MOSFET, which gives a control voltage equal to or higher than the ON-level between the gate and source of each MOSFET for a period during which the control voltage supply control switch is in an OFF-state.

As described above, if it is comprised a control voltage supply circuit provided with a control voltage supply control switch which is ON/OFF-controlled by the drain-source voltage of each MOSFET so as to be set in an OFF-state when a forward voltage is applied to the parasitic diode of each MOSFET and set in an ON-state when a reverse voltage is applied to the parasitic diode of each MOSFET, to thereby give a control voltage equal to or higher than the ON-level between the gate and source of each MOSFET for a period during which the control voltage supply control switch is in an OFF-state, it possible to give each MOSFET a drive signal for ON/OFF control and a control voltage for reducing channel loss without using any expensive comparators and thereby reduce the cost.

When N-channel type MOSFETs are used, the m MOSFETs are preferably provided with their respective sources commonly connected. In this case, too, the FET control section is comprised of a low-speed drive signal supply circuit which gives, when the rotational speed of the internal combustion engine is equal to or lower than a set value, a drive signal varying between an ON level which turns ON each MOSFET and an OFF level which turns OFF each MOSFET at a frequency higher than the output frequency of the generator between the gate and source of each MOSFET and a control voltage supply circuit which gives a control voltage equal to or higher than the ON-level between the gate and source of each MOSFET for a period during which a forward voltage is applied to both ends of the parasitic diode of each MOSFET.

In this case, the control voltage supply circuit may comprise an NPN transistor provided for each MOSFET, a collector and a base thereof being connected to an output terminal on a positive electrode side of the rectifier circuit through a first resistor and a second resistor, an emitter thereof being connected to a part having the same potential as that of a source of the corresponding MOSFET, a single transistor control diode or a plurality of transistor control diodes connected in series between a base of each transistor and a drain of the corresponding MOSFET with anodes facing the base of each transistor and a backflow prevention diode connected between a collector of each transistor and a gate of the corresponding MOSFET with an anode facing the collector of the transistor. In this case, the number of the transistor control diodes is set so that a voltage between the base of the corresponding transistor and the source of each MOSFET is higher than a base-emitter voltage of the corresponding transistor when a reverse voltage is applied to the parasitic diode of each MOSFET and a voltage between the base of the corresponding transistor and the source of each MOSFET is lower than the base-emitter voltage of the corresponding transistor when a forward voltage is applied to the parasitic diode of each MOSFET.

In a preferable aspect of the present invention, the apparatus further comprises a voltage adjusting signal supply circuit which gives, when the output voltage of the rectifier circuit exceeds a set value, a voltage adjusting signal equal to or higher than an ON-level between the gates and sources of the m MOSFETs.

Providing the above described voltage adjusting signal supply circuit makes it possible to turn ON, when the output voltage of the power supply apparatus increases excessively, the MOSFET to short-circuit the output of the generator and reduce the output voltage of the power supply apparatus, and cancel, when the output voltage of the power supply apparatus falls below a set value, the short-circuit of the output of the generator, to increase the output voltage, and thereby keep the output voltage of the power supply apparatus to close to the set value and prevent an excessive voltage from being given to the load.

As described above, according to the present invention, since a control voltage supply circuit is provided with a control voltage supply control switch which is ON/OFF-controlled by the drain-source voltage of each MOSFET so as to be set in an OFF-state when a forward voltage is applied to the parasitic diode of each MOSFET and set in an ON-state when a reverse voltage is applied to the parasitic diode of each MOSFET, which gives a control voltage equal to or higher than the ON-level between the gate and source of each MOSFET for a period during which the control voltage supply control switch is in an OFF-state, it is possible to give each MOSFET a drive signal for ON/OFF-control according to the polarity of the drain-source voltage of each MOSFET and a control voltage for reducing channel loss without comparing the potentials of the input terminals. Therefore, it is possible to omit a comparator which compares a potential of each input terminal with potentials of other input terminals and thereby reduce the cost.

Furthermore, in the present invention, a control voltage is generated by controlling the control voltage supply control switch according to the polarity of the drain-source voltage of each MOSFET, and therefore it is not necessary to distinguish between phases when connecting output leads of the generator to the input terminals of the power supply apparatus. Therefore, it is not necessary to change the colors of the output leads of the generator one another and it is thereby possible to reduce the cost of the generator. Furthermore, when connecting the output leads of the generator to the input terminals, it is not necessary to distinguish colors of the output leads, which can simplify the connection work.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIGS. 2A to 2D are waveform diagrams showing a voltage waveform of each section of FIG. 1;

FIGS. 3A to 3E are waveform diagrams showing a voltage waveform of each section and ON/OFF operation of a transistor in an area where the rotational speed of an engine exceeds a set value.

DETAILED DESCRIPTION OF THE PREFERRED EMBODIMENTS

With reference now to the attached drawings, embodiments of the present invention will be explained below.

Figure 1:
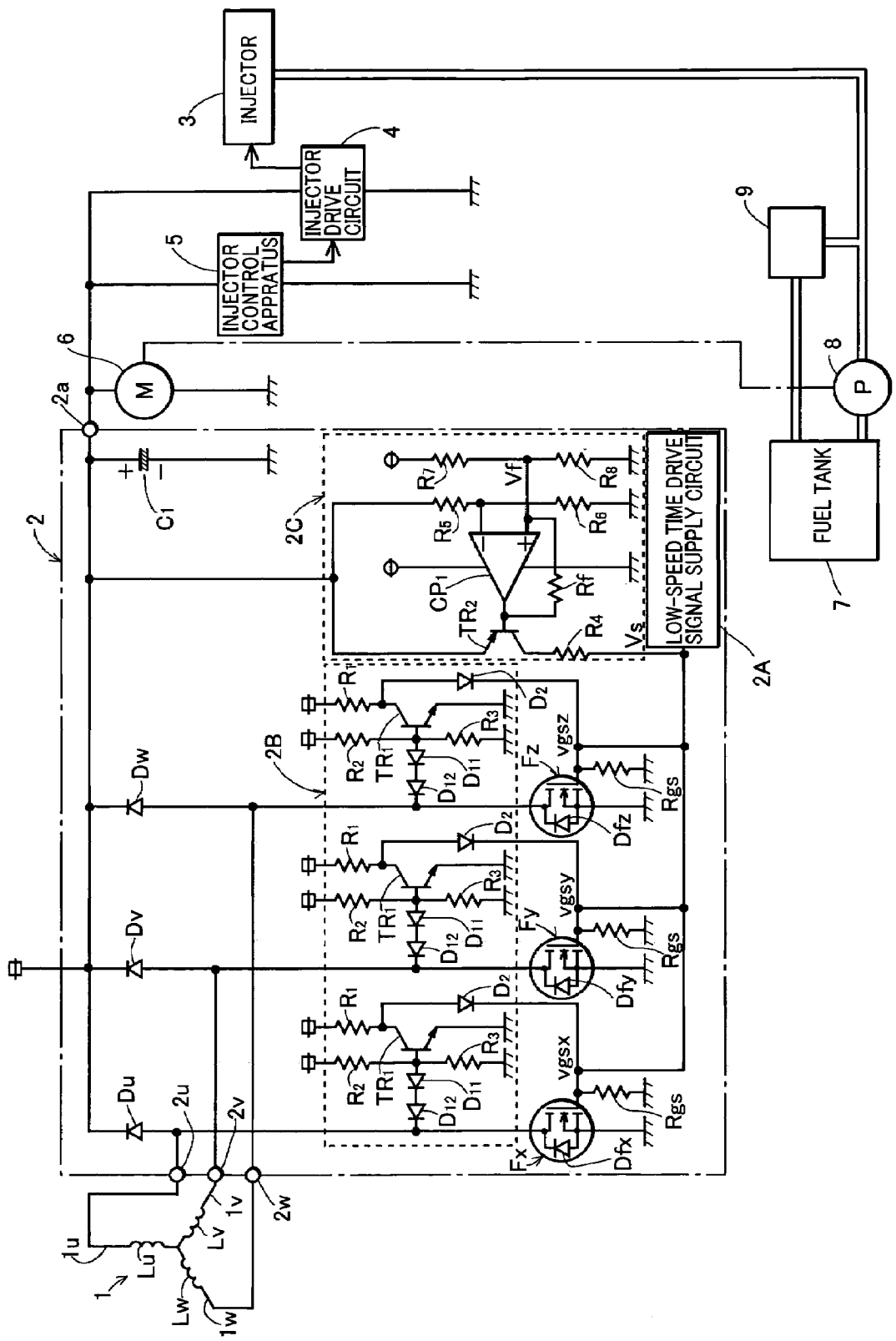
FIG. 1 is a circuit diagram showing the construction of a first embodiment of the present invention.

FIG. 1 shows a first embodiment of a power supply apparatus according to the present invention. The present invention is applied to a power supply apparatus for a fuel injection apparatus comprised of n (n: integer of 2 or greater) input terminals to which a single-phase or multi-phase AC voltage is input from a magneto AC generator driven by an internal combustion engine, m (m: integer of 2 or greater and not greater than n) MOSFETs with ones of drains and sources commonly connected and the others connected to m input terminals of the n input terminals and parasitic diodes formed between the drains and sources of the m MOSFETs and 2n−m rectification diodes provided so as to constitute together a diode bridge full-wave rectifier circuit which rectifies an AC voltage given to the n input terminals, where m=n=3 is assumed in the embodiment shown in FIG. 1.

In FIG. 1, a reference numeral 1 denotes a magneto AC generator driven by an internal combustion engine (not shown) and this generator is comprised of 3-phase armature coils Lu to Lw star-connected on a stator side thereof A reference numeral 2 denotes a power supply apparatus according to the present invention and this power supply apparatus is comprised of 3-phase input terminals 2u to 2w connected to 3-phase output terminals 1u to 1v of the generator drawn from terminals on a non-neutral point side of the armature coils Lu to Lw, three N-channel type MOSFETs Fx to Fz whose sources are commonly connected to a ground potential section and whose drains are connected to input terminals 2u to 2w respectively and rectification diodes Du to Dw whose cathodes are commonly connected and whose anodes are connected to the drains of the MOSFETs Fx to Fz respectively, and parasitic diodes Dfx to Dfz formed between the respective drains and sources of the MOSFETs Fx to Fz, which constitute together with the three rectification diodes Du to Dw a 3-phase diode bridge full-wave rectifier circuit. A resistor Rgs is connected between the gate and source of each MOSFET.

In the above described full-wave rectifier circuit, the common connection point of the cathodes of the diodes Du to Dw constitutes a DC output terminal on the positive electrode side, while the common connection point of the sources of the MOSFETs Fx to Fz (common connection point of the anodes of the parasitic diodes Dfx to Dfz) constitutes a DC output terminal on the negative electrode side. A smoothing capacitor C1 is connected between the output terminals of the rectifier circuit. Furthermore, a load connection terminal 2a on the positive electrode side is drawn out of the output terminal on the positive electrode side of the rectifier circuit and a load constituting the fuel injection apparatus is connected between this load connection terminal and a grounding circuit.

The power supply apparatus 2 is also provided with an FET control section which controls the MOSFETs Fx to Fz. The FET control section in the figure is comprised of a low-speed drive signal supply circuit 2A which gives a drive signal varying between an ON-level to turn ON and an OFF level to turn OFF each MOSFET between the gate and source of each MOSFET at a frequency higher than the output frequency of the generator when the rotational speed of the internal combustion engine is equal to or lower than a set value, a control voltage supply circuit 2B which gives a control voltage equal to or higher than the ON-level between the gate and source of each MOSFET for a period during which a forward voltage is applied to both ends of the parasitic diode of each MOSFET and a voltage adjusting signal supply circuit 2C which gives a voltage adjusting signal equal to or higher than the ON-level between the respective gates and sources of the three MOSFETs Fx to Fz when the output voltage of the rectifier circuit exceeds a set value.

The low-speed drive signal supply circuit 2 A is comprised of an oscillator which generates a square wave signal which varies between an ON-level and OFF level at a frequency sufficiently higher than the output frequency of the generator when the rotational speed of the engine is equal to or lower than a set value and the output of this low-speed drive signal supply circuit 2A is given between the respective gates and sources of the MOSFETs Fx to Fz simultaneously.

The control voltage supply circuit 2B is provided for each MOSFET and comprised of a NPN transistor TR1 whose collector and base are connected to the output terminal on the positive electrode side of the rectifier circuit through a first resistor R1 and a second resistor R2 respectively and whose emitter is connected to a part having the same potential as that of the source of the MOSFET (ground potential section in the example in the figure), two transistor control diodes D11 and D12 connected in series between the base of each transistor and the drain of the corresponding MOSFET with their anodes facing the base of each transistor and a backflow prevention diode D2 connected between the collector of each transistor and the gate of the corresponding MOSFET with the anode facing the collector of the transistor. Furthermore, a resistor R3 is connected between the base of each transistor TR1 and ground.

In the control voltage supply circuit 2B shown in the figure, the number of transistor control diodes (2 in the example in the figure) is set so that when a reverse voltage is applied to the parasitic diode of each MOSFET, the voltage between the base of the corresponding transistor and the source of each MOSFET is higher than the base-emitter voltage of the corresponding transistor and when a forward voltage is applied to the parasitic diode of each MOSFET, the voltage between the base of the corresponding transistor and the source of each MOSFET is lower than the base-emitter voltage of the corresponding transistor. If the above described condition is met by only providing any one of the transistor control diodes D11, D12, one of the transistor control diodes D11, D12 can be omitted.

The voltage adjusting signal supply circuit 2C is a circuit which gives a voltage adjusting signal equal to or higher than the ON-level between the respective gates and sources of the MOSFETs Fx to Fz when an output voltage of the full-wave rectifier circuit comprised of the parasitic diodes of the MOSFETs Fx to Fz and the rectification diodes Du to Dw exceeds a set value. The voltage adjusting signal supply circuit 2C shown in the figure is comprised of a PNP transistor TR2 whose emitter is connected to the DC output terminal on the positive electrode side of the full-wave rectifier circuit and whose collector is connected to the gates of the MOSFETs Fx to Fz through a resistor R4 and a comparator CP1 whose output terminal is connected to the base of the transistor TR2. An output voltage detection signal Vo obtained by dividing the output voltage of the rectifier circuit through a voltage divider circuit comprised of a series circuit made up of resistors R5 and R6 is input to an inverted input terminal of the comparator CP1 and a reference voltage Vf obtained by dividing the output voltage of a constant voltage power supply circuit (not shown) through a voltage divider circuit comprised of resistors R7 and R8 is input to a non-inverted input terminal of the comparator CP1. Furthermore, a feedback resistor Rf is connected between the non-inverted input terminal and the output terminal of the comparator CP1.

The fuel injection apparatus driven by the above described power supply apparatus 2 is comprised of an injector 3 attached to an intake pipe or the like of an internal combustion engine, an injector drive circuit 4 which supplies a drive current to a solenoid of the injector 3 when an injection command is given, an injector control apparatus 5 which gives an injection command signal to the injector drive circuit 4, a pump motor 6, a fuel pump 8 which is driven by the pump motor 6 and gives fuel from a fuel tank 7 to the injector 5 and a pressure regulator 9 which controls the pressure of the fuel given from the fuel pump 8 to the injector 3 to a constant pressure. Of these components of the fuel injection apparatus, the injector drive circuit 4, injector control apparatus 5 and pump motor 6 are connected between the load connection terminal 2a and ground as a load.

The injector control apparatus 5 is comprised of a microprocessor and a constant voltage power supply circuit which converts the output voltage of the power supply apparatus 2 to a constant voltage suited to driving the microprocessor and the microprocessor controls a signal width of an injection command signal and timing for generating the injection command according to various control conditions. The injector 3 opens a valve and injects fuel into the intake pipe of the internal combustion engine or the like while the injection command signal is being given from the injector control apparatus 5 to the injector drive circuit 4.

In this embodiment, the fuel pump 8 is driven by the pump motor 6, but a fuel pump which is driven by the internal combustion engine may also be used.

FIGS. 2A to 2D show waveforms of 3-phase AC voltages Vu, Vv and Vw given from the generator 1 to the input terminals 2u to 2w when the rotational speed of the engine is equal to or lower than a set value (during low-speed rotation) and signals Vgsx to Vgsz given between the respective gates and sources of the MOSFETs Fx to Fz. Furthermore, FIGS. 3A to 3E show a voltage VDS between the drain and source of the MOSFET Fx when the rotational speed of the engine is in an area exceeding the set value, ON/OFF operation of the corresponding transistor TR1, potential Vc of the collector of the transistor TR1, voltage adjusting signal Vs given from the voltage adjusting signal supply circuit 2C and voltage Vgsx between the gate and source of the MOSFET.

In the control voltage supply circuit 2B shown in the figure, when a reverse voltage is applied to a parasitic diode of each MOSFET and when the MOSFET is in an ON-state, a base current is given from the DC output terminal on the positive electrode side of the full-wave rectifier circuit through each resistor R2 to each transistor TR1 causing each transistor TR1 to turn ON. When each transistor TR1 is in an ON-state, a control voltage equal to or higher than the ON-level is never given between the gate and source of the corresponding MOSFET. When the rotational speed of the engine is equal to or lower than the set value, the low-speed drive signal supply circuit 2A generates a drive signal which varies between the ON level and OFF level of the MOSFET. Therefore, during a low-speed operation of the engine, when a reverse voltage is applied to the parasitic diode of each MOSFET, the waveform of a signal voltage applied between the gate and source of each MOSFET becomes a waveform of a drive signal given from the drive signal supply circuit 2A and each MOSFET is ON/OFF-controlled by this drive signal. This causes the current flowing from the armature coils Lu to Lw through the rectifier circuit to be turned ON/OFF, thereby causing induced voltages of the armature coils Lu to Lw to be stepped up and these stepped up voltages are rectified by the rectifier circuit and supplied to the load.

Furthermore, when a forward voltage is applied to the parasitic diode of each MOSFET, a forward voltage drop is produced between both ends of the parasitic diode by a current flowing through the parasitic diode of each MOSFET and this voltage drop causes the voltage between the base of each transistor and the source of the corresponding MOSFET to be lower than a base-emitter voltage VBE of each transistor, which prevents the base current from flowing into the transistor TR1 and turns OFF each transistor TR1. Therefore, when a forward voltage is applied to the parasitic diode of each MOSFET, the collector-emitter voltage of the corresponding transistor TR1 increases to the ON-level of the MOSFET or higher. The collector-emitter voltage Vc of this transistor TR1 is applied between the gate and source of each MOSFET as a control voltage. At this time, the waveform of the gate-source voltage of each MOSFET is a waveform retaining a constant value equal to or higher than the ON-level, contributing to a reduction of channel loss of each MOSFET.

When the rotational speed of the engine exceeds a set value, the low-speed drive signal supply circuit 2A stops outputting a drive signal, and therefore only a control voltage is given between the gate and source of each MOSFET. That is, in the area where the rotational speed of the engine exceeds the set value, a control voltage having a constant value Vc is applied between the gate and source of each MOSFET for a period during which a forward voltage is applied between both ends of the parasitic diode of each MOSFET, but no intermittent drive signal is applied for a period during which a reverse voltage is applied to the parasitic diode of each MOSFET. Therefore, no stepping up operation by the MOSFET is performed in the area where the rotational speed of the engine exceeds the set value.

As described above, controlling ON/OFF of the transistor TR1 by means of the polarity of the voltage between both ends of each MOSFET to thereby generate a control voltage eliminates the necessity to distinguish between phases when connecting output leads of the generator to the input terminals 2u to 2w, eliminates the necessity to change the colors of the output leads of the generator one another and can thereby reduce the cost of the generator. Furthermore, when connecting the output leads of the generator to the input terminals, it is not necessary to consider phases, which can simplify the connection work.

In the voltage adjusting signal supply circuit 2C, the output voltage detection signal Vo is set to exceed the reference voltage Vf when the output voltage of the rectifier circuit exceeds a set value. When the output voltage of the rectifier circuit is equal to or lower than the set value, the output voltage detection signal Vo is equal to or lower than the reference voltage Vf, and therefore the output voltage of the comparator CP1 is at a high level. At this time, the transistor TR2 is in an OFF-state, and therefore the voltage adjusting signal Vs is never given to each MOSFET. On the contrary, when the output voltage of the rectifier circuit exceeds a set value during a high-speed rotation of the engine, the output voltage detection signal Vo exceeds the reference voltage Vf, and therefore the potential of the output terminal of the comparator CP1 becomes the ground potential and the transistor TR2 turns ON. When the transistor TR2 is in an ON-state, a voltage adjusting signal Vs equal to or higher than the ON-level is given between the emitter and collector of the transistor TR2 from the output terminal on the positive electrode side of the rectifier circuit and between the gates and sources of the MOSFETs Fu to Fw through the resistor R4. At this time, if the voltage applied between the drain and source of the MOSFET has the polarity with which a reverse voltage is applied to the parasitic diode thereof, the MOSFET turns ON and the drain-source voltage of the MOSFET drops as shown at the right end of FIG. 3A. This causes the output voltage of the rectifier circuit to drop. When the potential of the output terminal of the comparator CP1 becomes the ground potential, the potential (reference voltage) of the non-inverted input terminal of the comparator drops through the feedback resistor Rf. When the output voltage of the rectifier circuit becomes lower than the set value and the output voltage detection signal Vo falls below the reduced reference voltage Vf, the output voltage of the comparator CP1 becomes a high level, and therefore the transistor TR2 turns OFF and the output of the voltage adjusting signal is stopped. Through these operations, the output voltage of the rectifier circuit is kept close to the set value.

In the embodiment shown in FIG. 1, the resistor R3 is provided to adjust a bias level of the transistor TR1 and is not essential. Furthermore, the resistor Rgs is provided to discharge when turning OFF the MOSFET. If a circuit that has an equivalent function to the resistor Rgs is provided in the voltage adjusting signal supply circuit 2C, the resistor Rgs can be omitted.

Figure 4:
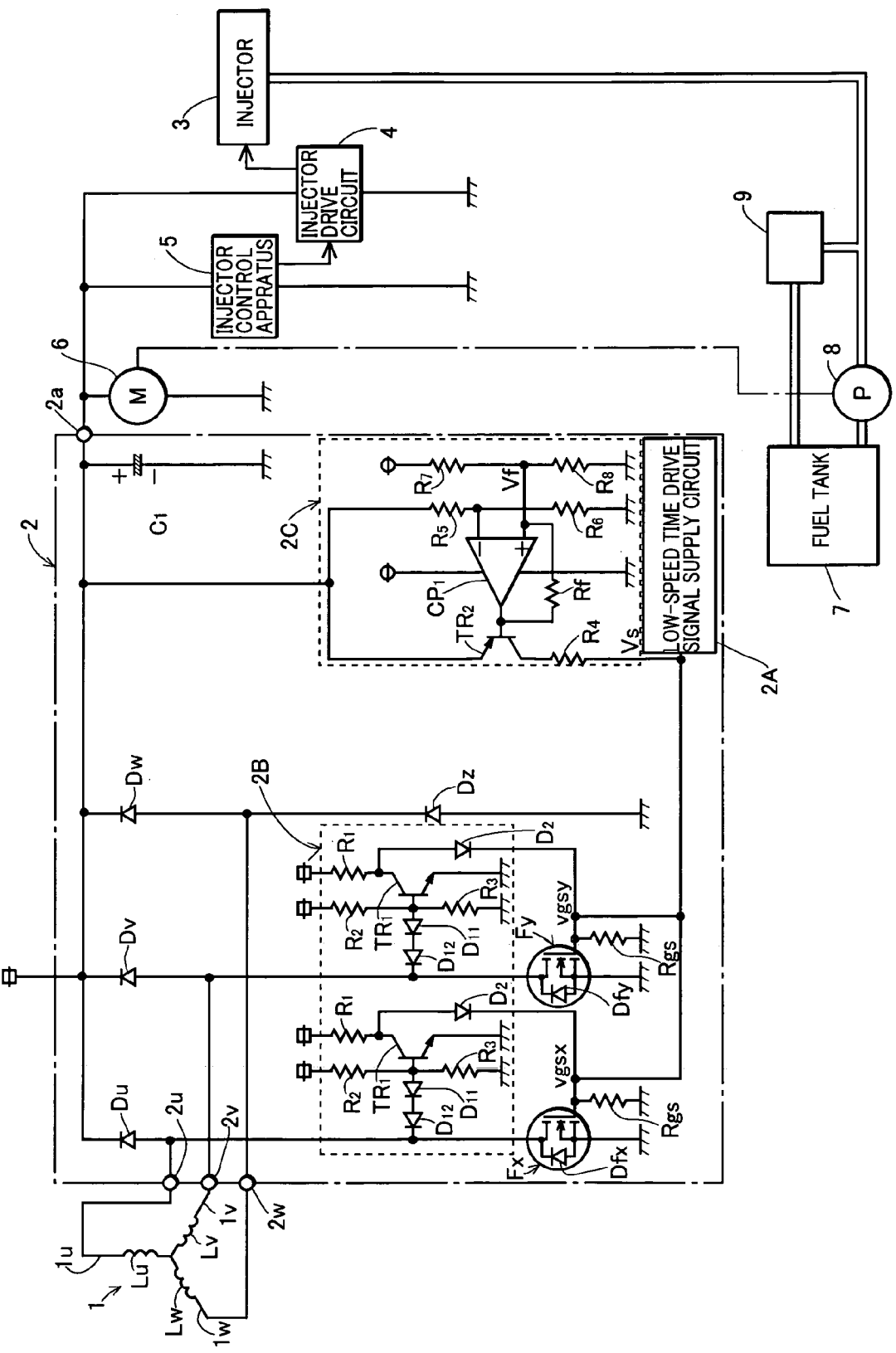
FIG. 4 is a circuit diagram showing the construction of a second embodiment of the present invention.

The above described embodiment assumes a case where m=n=3 and three input terminals to which the output terminals of the 3-phase AC generator are connected are provided to constitute a 3-phase diode bridge rectifier circuit by providing the three MOSFETs Fx to Fz whose sources are commonly connected, the parasitic diodes of these MOSFETs and three diodes Du to Dw, but as shown in FIG. 4, it is also possible to set n=3, m=2 and provide two MOSFETs Fx and Fy whose sources are commonly connected and whose drains are connected to the two input terminals 2u and 2v to constitute a rectifier circuit with the parasitic diodes Dfx and Dfy of these MOSFETs and four rectification diodes Du, Dv, Dw and Dz.

The above described embodiment uses the generator which generates a 3-phase AC voltage, but the present invention is also applicable to a case where a generator which outputs a single-phase (n=2) AC voltage is used, and the present invention is also applicable to a case where an AC generator having multi phases of three or more phases is used.

The control voltage supply circuit 2B may be any circuit if it is at least provided with a control voltage supply control switch which is ON/OFF-controlled by the drain-source voltage of each MOSFET so that it is in an OFF-state while a forward voltage is being applied to the parasitic diode of each MOSFET and in an ON-state while a reverse voltage is being applied to the parasitic diode of each MOSFET so as to give a control voltage equal to or higher than the ON-level of the MOSFET between the gate and source of each MOSFET for a period during which the control voltage supply control switch is in an OFF-state, and is not limited to the above described example.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. A power supply apparatus which gives a supply voltage to a fuel injection apparatus of an internal combustion engine, comprising:
   n (n: integer of 2 or greater) input terminals to which a single-phase or multi-phase AC voltage is input from a magneto AC generator driven by said internal combustion engine;
   m (m: integer of 2 or greater and not greater than n) MOSFETs with ones of drains and sources commonly connected and the others connected to m input terminals of said n input terminals;
   parasitic diodes formed between the drains and sources of said m MOSFETs and 2n−m rectification diodes provided so as to constitute together a diode bridge full-wave rectifier circuit which rectifies an AC voltage given to the n input terminals; and
   an FET control section which performs control, when the rotational speed of said internal combustion engine is equal to or lower than a set value, so that MOSFETs, to the drain-source parasitic diodes of which a reverse voltage is applied out of said m MOSFETs are turned ON/OFF at a frequency higher than the output frequency of said generator,
   wherein said FET control section comprises:
   a low-speed drive signal supply circuit which gives, when the rotational speed of said internal combustion engine is equal to or lower than a set value, each MOSFET a drive signal varying between an ON level which turns ON each MOSFET and an OFF level which turns OFF each MOSFET at a frequency higher than the output frequency of said generator; and a control voltage supply circuit provided with a control voltage supply control switch which is ON/OFF-controlled by the drain-source voltage of each MOSFET so as to be set in an OFF-state when a forward voltage is applied to the parasitic diode of each MOSFET and set in an ON-state when a reverse voltage is applied to the parasitic diode of each MOSFET, which gives a control voltage equal to or higher than said ON-level between the gate and source of each MOSFET for a period during which said control voltage supply control switch is in an OFF-state, and a DC voltage output from said diode bridge full-wave rectifier circuit is given to the fuel injection apparatus of said internal combustion engine as a supply voltage.

2. A power supply apparatus which gives a supply voltage to a fuel injection apparatus of an internal combustion engine, comprising:

n (n: integer of 2 or greater) input terminals to which a single-phase or multi-phase AC voltage is input from a magneto AC generator driven by an internal combustion engine;

m (m: integer of 2 or greater and not greater than n) N-channel type MOSFETs with sources commonly connected and drains connected to m input terminals of said n input terminals;

parasitic diodes formed between the drains and sources of the m MOSFETs and 2n−m rectification diodes provided so as to constitute together a diode bridge full-wave rectifier circuit which rectifies an AC voltage given to the n input terminals; and an FET control section which performs control, when the rotational speed of said internal combustion engine is equal to or lower than a set value, so that MOSFETs, to the drain-source parasitic diodes of which a reverse voltage is applied out of said m MOSFETs are turned ON/OFF at a frequency higher than the output frequency of said generator, wherein said FET control section comprises: a low-speed drive signal supply circuit which gives, when the rotational speed of said internal combustion engine is equal to or lower than a set value, a drive signal varying between an ON level which turns ON each MOSFET and an OFF level which turns OFF each MOSFET at a frequency higher than the output frequency of said generator between the gate and source of each MOSFET; and a control voltage supply circuit which gives a control voltage equal to or higher than said ON-level between the gate and source of each MOSFET for a period during which a forward voltage is applied to both ends of the parasitic diode of each MOSFET, said control voltage supply circuit comprises: an NPN transistor provided for each MOSFET, a collector and a base thereof being connected to an output terminal on a positive electrode side of said rectifier circuit through a first resistor and a second resistor, an emitter thereof being connected to a part having the same potential as that of a source of the corresponding MOSFET; a single transistor control diode or a plurality of transistor control diodes connected in series between a base of each transistor and a drain of the corresponding MOSFET with anode(s) of said diode(s) facing the base of each transistor; and a backflow prevention diode connected between a collector of each transistor and a gate of the corresponding MOSFET with an anode of said diode facing the collector of the transistor, the number of said transistor control diodes is set so that a voltage between the base of the corresponding transistor and the source of each MOSFET is higher than a base-emitter voltage of the corresponding transistor when a reverse voltage is applied to the parasitic diode of each MOSFET and a voltage between the base of the corresponding transistor and the source of each MOSFET is lower than the base-emitter voltage of the corresponding transistor when a forward voltage is applied to the parasitic diode of each MOSFET, and a DC voltage output from said diode bridge full-wave rectifier circuit is given to the fuel injection apparatus of said internal combustion engine as a supply voltage.

3. The power supply apparatus for a fuel injection apparatus according to claim 1, further comprising a voltage adjusting signal supply circuit which gives, when the output voltage of said rectifier circuit exceeds a set value, a voltage adjusting signal equal to or higher than an ON-level between the gates and sources of said m MOSFETs.

4. The power supply apparatus for a fuel injection apparatus according to claim 2, further comprising a voltage adjusting signal supply circuit which gives, when the output voltage of said rectifier circuit exceeds a set value, a voltage adjusting signal equal to or higher than an ON-level between the gates and sources of said m MOSFETs.

* * * * *